April 9, 1968     L. BELOVE     3,377,202
PROCESS FOR PRODUCING SINTERED NICKEL ELECTRODE PLATES
Filed Aug. 1, 1966     2 Sheets-Sheet 1
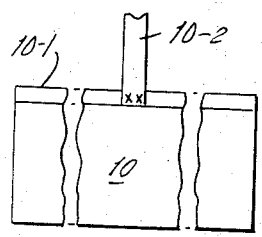
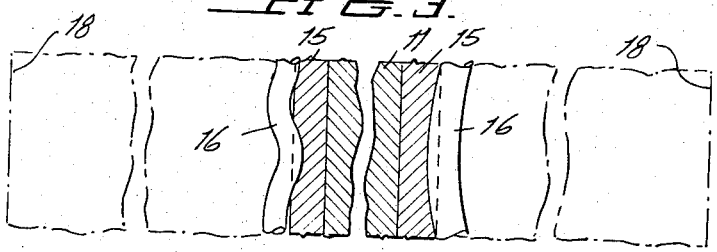
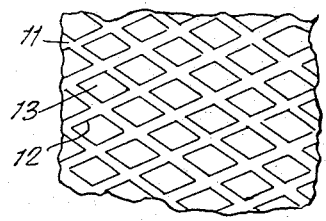
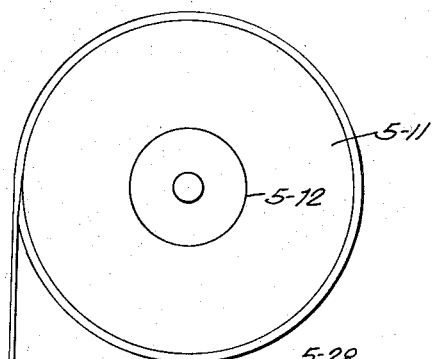
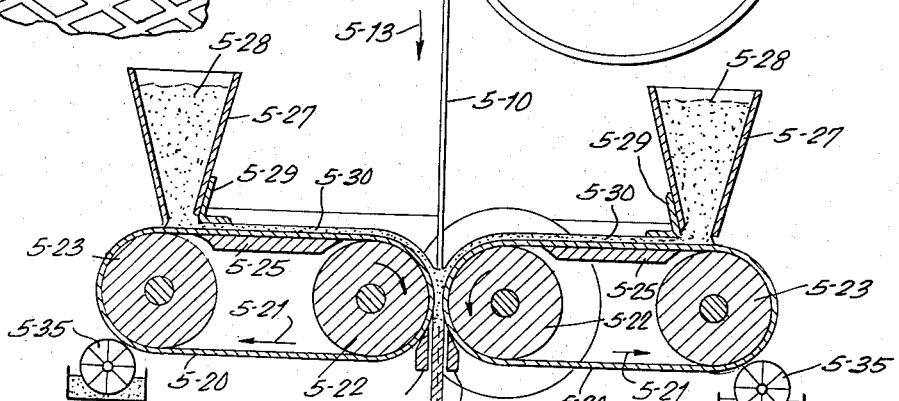
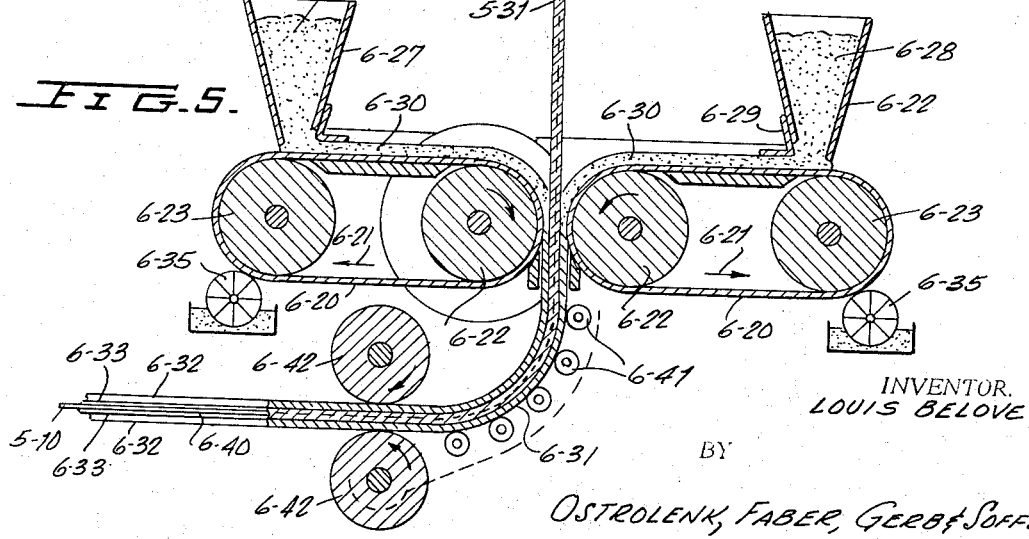
INVENTOR.
LOUIS BELOVE
BY
OSTROLENK, FABER, GERB & SOFFEN
ATTORNEYS

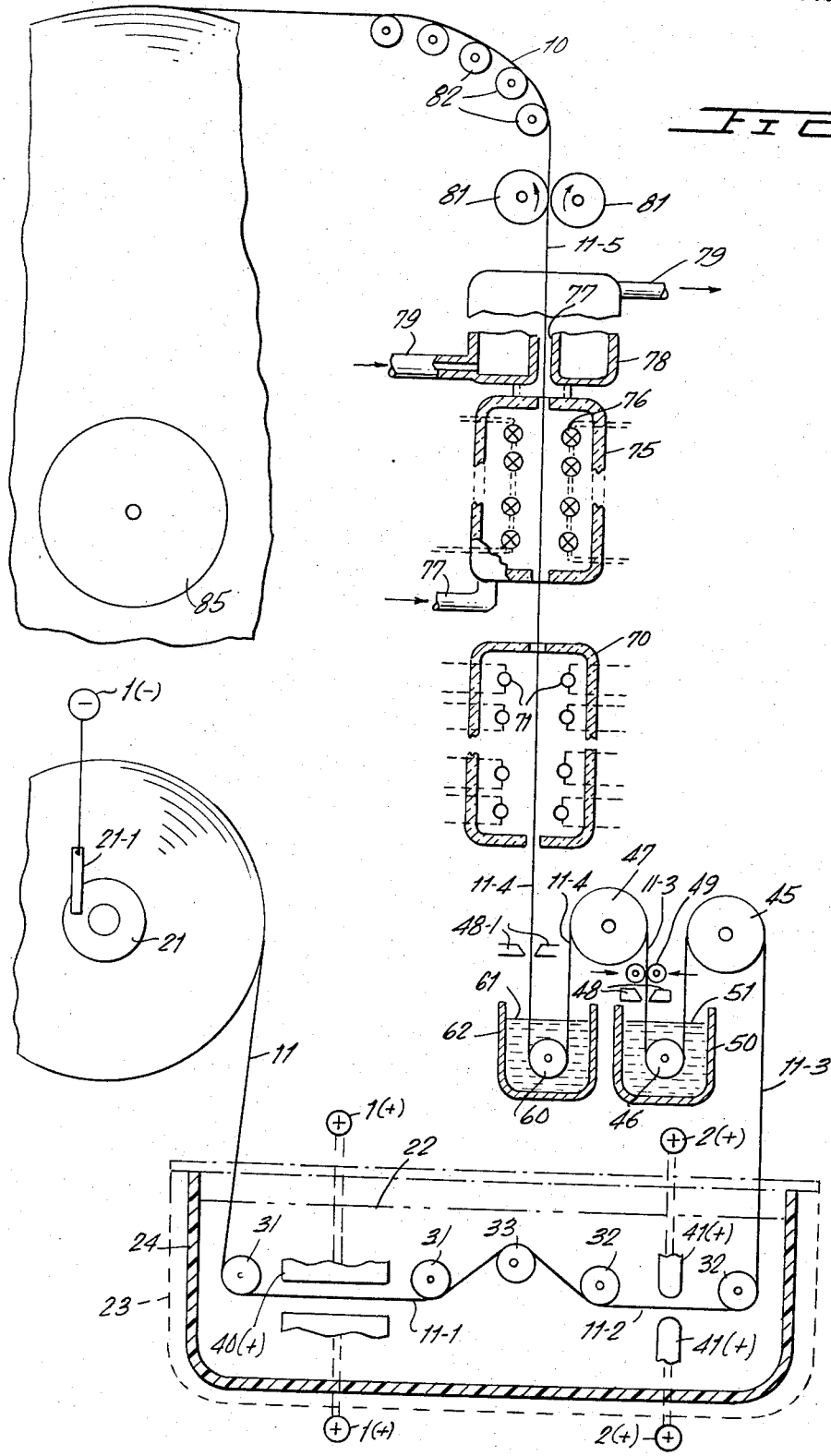

United States Patent Office 3,377,202
Patented Apr. 9, 1968

3,377,202
PROCESS FOR PRODUCING SINTERED
NICKEL ELECTRODE PLATES
Louis Belove, Ardsley, N.Y., assignor to Sonotone Corporation, Elmsford, N.Y., a corporation of New York
Filed Aug. 1, 1966, Ser. No. 569,233
6 Claims. (Cl. 136—29)

ABSTRACT OF THE DISCLOSURE

A method of producing sintered porous electrode plates usable in rechargeable battery cells as set forth. The method is comprised of providing a thin, strong metallic support sheet which has perforations or openings over 30% to 80% of its entire surface. The perforations may be formed by providing a sheet having a thin, strand-like structure which defines openings or perforations between the intersecting strands. The surfaces of the support sheet are electroplated with a thin, porous nickel coating, thereafter nickel powder particles are deposited thereon either through the use of an aqueous slurry or through powder metallurgy techniques. The deposited material is pressed against the surface of the support member to increase surface contact between the particles and the nickel coating on the support sheet. The nickel powder particles are admixed with a filler substance which evolves hydrogen to form a layer of a predetermined porosity. The hydrogen is emitted in a sintering treatment in the presence of a hydrogen reducing atmosphere. A second layer of a second predetermined thickness and having a greater amount of the distributed filler substance is deposited upon the first layer and is sintered in a like manner. The outermost layer has a higher porosity than the innermost layer.

---

This invention relates to sintered electrode plates for alkaline batteries, such as nickel-cadmium batteries. The sintered electrode plates of such batteries consist of sintered porous layers of fine metal particles, usually of carbonyl nickel, having embedded therein a metallic supporting sheet formed of a perforated metal sheet or a wire-like mesh sheet. Examples of similar porous sintered metal-powder plates are described in U.S. Patents 2,157,-596 (of Davis—without a reinforcing member); 2,672,-495 (of Fleischer) and in the Fleischer article in "Journal of the Electrochemical Society," vol. 94, pp. 289–299 referred to therein; 2,681,375 and 2,819,962 (both of of H. Vogt—hereinafter called "Vogt"); 2,696,515 (of Koren et al.); 2,771,499 (of Fleischer); 2,832,813 (of Peters); and 3,062,908 (of Salkind).

According to Vogt Patent 2,836,641 (a division of his Patent 2,681,375), his porous sintered particle layers consist of nickel powder particles "of low weight per unit volume, e.g., less than 1.5 grams per cubic cm." As a reinforcing carrier, he uses a solid or perforated metal sheet (or fine wire gauze sheet) from 0.2 mm. to .05 mm. (millimeter) thick. Vogt states that by the process of his patents, he produces with such nickel powder a sintered "microporous metal layer that adheres to the carrier foil" (col. 1, lines 64–72); and that he produces a porous "ductile electrode skeleton which is very suitable for the reception of the . . . hydroxides of cadmium, nickel, iron or cobalt" (col. 2, lines 2–13). The patentee Vogt has actually supplied such sintered battery electrode plates, having a ductle thin porous sintered nickel powder layer adherng to a thin nickel support sheet or to a similar thin nickel-plated steel support sheet.

The French corporation Societe des Accumulateurs Fixes et de Traction—hereinafter called "SAFT"—has acquired from Vogt his secret of making ductile porous sintered nickel electrode plates wherein the sintered powder layer adheres to such reinforcing sheet.

Except for Vogt and SAFT, referred to above, and their licensees, all attempts by others skilled in the art of powder metallurgy to produce similar electrode plates wherein a porous layer of sintered nickel powder particles remains joined by sinter bonds with a nickel or nickel-plated support sheet by the processes described in the foregoing two Vogt patents proved to be failures. Instead, they had to rely on the sintered bonds between the nickel powder particles which filled the interstices or openings in the support sheet with the nickel powder particles of the porous sintered nickel powder layer or layers held on the support sheet for supporting the sintered porous nickel powder layers on the support sheet.

Among the objects of the invention is to provide a process for producing a porous sintered nickel powder layer having a stratum of sintered nickel powder particles adhering to the wire-mesh carrier or metal-foil carrier embedded in the sintered nickel powder layer.

In accordance with the invention, the support sheet which may consist of a very thin rolled nickel or steel sheet and may be a reticulated sheet or a wire-mesh sheet is electroplated by a suitable electrodepositing process with a thin porous nickel coating. To the exposed porous coating surfaces are applied thin layers of nickel powder particles containing dispersed therein a heat decomposable filler substance having the property of and being of sufficient proportion to be decomposed as the porous nickel coating of the support sheet and the deposited powder layer mixture are heated to sintering temperature with the decomposed filler substance providing the required porosity of the sintered powder layers and also supplying hydrogen to maintain all exposed surfaces of nickel powder particles and of the porous nickel coating with an atmosphere of hydrogen gas. In addition, a reducing gas atmosphere is maintained in the sintering furnace in accordance with heretofore used procedures. A minute addition of an adhesive ingredient assists in securing adhesion of the powder mixture layers to the support sheet and releases a hydrogen atmosphere as the temperature of the powder mixture and the porous nickel coating of the support sheet are heated to sintering temperature and maintain their to-be-sintered nickel surfaces within an oxide reducing hydrogen atmosphere. Good results are secured by admixing with the nickel powder a proportion of filler powder particles of urea—$CO(NH_2)_2$—which decomposes in the sintering treatment and releases hydrogen gas in an amount sufficient to maintain all exposed nickel powder and porous coating surfaces within an oxide reducing hydrogen atmosphere. The powder mixture may also have admixed thereto a minute amount of a further powdered proportion of known adhesive organic polymeric substance in addition to urea to assist adhesion of the above described powder mixture layers to the porous nickel plated coatings of the support sheet. Such adherence should not interfere, but to the extent possible assist in maintaining a hydrogen atmosphere around all the exposed to-be-sintered nickel powder and porous coating surfaces.

Furthermore, the nickel powder layers are compressed as by a pair of facing compression rollers against the facing porous nickel coating surfaces of the support sheet for thereby increasing the contact surface between the exposed porous nickel coating of the support sheet with the contacted longitudinal nickel carbonyl particles of the compressed powder mixture layer before they are subjected to the sintering operation.

The foregoing and other objects and features of the invention will be more fully understood from the following description of exemplifications thereof by reference to the annexed drawings wherein:

FIG. 1 is a side elevation of a sintered porous battery electrode plate made with a process of the invention;

FIG. 2 is a greatly enlarged detailed view of a portion of a wire-mesh-like reticulated rolled-metal support sheet used in the electrode plate of FIG. 1;

FIG. 3 is a very much magnified approximate cross-sectional view representing in a general way the relation of one innermost carbonyl-nickel fiber of the innermost porous sintered nickel powder layer stratum as it is joined by sinter bonds to a portion of the porous nickel coating of the support sheet of FIGS. 1 and 2;

FIG. 4 is a diagrammatic view of one form of process for making porous sintered nickel-particle electrode plate layers bonded to a strong metallic support sheet by the process of the invention; and FIG. 5 is a similar view of another form of process for making such electrode plates.

In the processes of the invention, a long known and used type of carbonyl nickel powder is used for making the sintered porous nickel particle layers of the metal-sheet supported electrode plates. As has been known, carbonyl nickel particles have the shape of minute fibers only a few microns thick and only a fraction of a mm. (millimeter), such as .2 or more mm. long. Such carbonyl nickel powder when loosely deposited has low density. In the form of process of the invention described below the strong support sheet consists of a very thin but strong rolled metal sheet of steel, for example, on which has been electrodeposited by known electroplating procedures a minutely thin porous coating of nickel. In the normal procedures of protecting steel against corrosion by electroplating with nickel, it is desired to electrodeposit on the steel surface a dense adherent nickel coating several microns thick. In contrast with such conventional nickel plating practice, there is deposited on the rolled sheet metal—not a dense nickel plating—but a porous nickel plating which has considerably less density than a fully dense nickel plating and is nearer to the density of carbonyl nickel powder.

As is known in the metallic deposition art, by using high-current density or by using certain addition agents in the plating bath on the metallic support sheet, as the cathode in a nickel electrodeposition bath, the nickel coating deposited on the metallic support sheet may be given substantial porosity. For brevity, the disclosure herein relies on the publications listed below and the therein identified further publications for the details of the nickel electrodeposition process used for forming a porous adhering nickel coating on the support sheet of the sintered porous battery plates made by the process of the present invention.

Modern Electroplating, edited by Frederic A. Lowenheim, published 1953 by John Wiley & Sons.

Modern Electroplating, by A. G. Gray.

Principles of Electroplating and Electroforming, by William Blum and George B. Hogabook, published 1924 by McGraw-Hill.

Galvanotechnik, by Jean Billiter, published 1957 by Springer Verlag, Vienna, Austria.

Electroplating Engineering Handbook, 2nd edition, edited by A. Kenneth Graham, published 1962 by Reinhold Publishing Co.

Electrochemistry, by Edmund Potter, published 1956, reprinted 1961 by The MacMillan Company.

Good results are obtained by using as a support sheet a rolled metal sheet of steel, for instance, which is only about .003 inch thick and which is coated with a porous nickel coating several microns thick. Alternatively, such rolled steel support sheet may be provided with perforations bounded by thin wire-like steel strands being in effect the equivalent of a rolled-steel wire-mesh support sheet, such as shown in FIG. 2.

Thereafter carbonyl nickel powder containing dispersed therein a heat-decomposable hydrogen-supplying filler substance addition is deposited in the form of thin adhering layers on the opposed low density porous nickel coating of the thin rolled-metal support sheet so that the total thickness is about .026 inch. Good results are secured with first depositing on the porous nickel coating such carbonyl-nickel dispersion to form first a carbonyl nickel powder dispersion coating only .003 to .005 inch thick and compressing these coatings against the porous nickel coatings, as with two oppositely revolving compression rollers followed by deposition of further layers of such carbonyl nickel dispersion to bring the total thickness of the plated metal support sheet with the deposited carbonyl nickel dispersion to the desired overall thickness, such as .026 inch.

Thereafter the metallic support sheet with the two such carbonyl nickel dispersion coatings adhering thereto are subjected to conventional sintering treatment within the conventional protective atmospheres described in issued patents and publications to secure adhering sinter bonds between not only the nickel powder particles, but also adhering sinter bonds between the exposed surfaces of the porous nickel plated coating of the support sheet and the adjoining innermost carbonyl-powder fiber-strata of the two nickel powder layers previously deposited thereon.

The two layers of carbonyl nickel powder containing the dispersion of the heat decomposable or vaporizable hydrogen supplying filler addition are applied or deposited on the exposed porous nickel coatings of the support either with a liquid slurry or by powder metallurgy process as known in the art.

As an example, an aqueous slurry having dissolved and dispersed therein in proper proportions carbonyl nickel powder and the above described decomposable filler ingredients is applied to opposite surfaces of the above described porous nickel platings of the support sheet to form thereon thin powder dispersion layers adhering to the support sheet. Urea dissolved in water and if necessary, sufficient additional urea powder is held uniformly dispersed between the nickel powder particles, as by a conventional stirrer, to provide the sintered nickel powder layer with the required porosity. Such urea addition gives the slurry the viscosity required for causing the two nickel-powder-containing slurry layers to adhere as thin slurry coatings to the porous nickel coatings of the support sheet. If needed, a small amount of a compatible adhesive substance which decomposes or vaporizes upon heating may be uniformly embodied in such aqueous slurry. From one quarter of one percent up to three percent by weight, if necessary, of known water soluble cellulose adhesives which are compatible with the urea addition may be used.

FIG. 1 shows an elevational side view of a long thin sintered porous electrode plate 10 made by the process of the invention. The particular electrode plate 10 is intended for use as part of a spirally coiled electrode assembly, for instance, comprising an electrolyte-holding separator having superposed thereon two overlapping opposite-polarity thin electrode plates such as described in connection with FIGS. 2 and 3 of U.S. Patent 3,083,249. However, in the electrode plates produced by the process of the present invention, they are made thin enough and the sinter bonds between the nickel particles and the support sheet are strong enough as to make it unnecessary for cracking the sintered nickel layer body of the plate along parallel adjacent track lines extended generally parallel to the coiling axis of the assembly.

The electrode plate 10 is formed with a support sheet 11 made of any rolled or drawn ductile metal. Good results are obtained by using a thin support sheet of steel or other compatible but strong metal about .003 to .005 inch thick, having, throughout its surface, perforations 13 which extend over 30 to 80% or even more of the sheet surface. A small portion of such reticulated support sheet 11 of the electrode plate of FIG. 1 is shown in FIG. 2 wherein thin wire-like strands 12 of the support sheet define between them the sheet openings or perforations 13 and being the equivalent and constituting in substance a wire-mesh sheet formed of drawn ductile metal wires defining between them similar sheet openings 13. Before sintering porous nickel powder layers to the support sheet, such as shown at 11, it has first deposited thereon, as by known electrodeposition processes referred to above, a porous adhering nickel coating a few microns thick, such as 3 to 7 or even up to 10 microns.

The continuous length of an elongated sintered plate structure is formed without the sintered nickel powder layer along one of the side edges of its internal support sheet 11 or at least has the porous sintered powder layer compacted to high density along the edge 10–1. To this plate edge 10–1 is welded, as indicated by conventional welding cross marks, a nickel sheet tab 10–2 which serves to connect the respective electrode plate to its proper polarity battery cell terminal.

A continuous length of such thin metallic support sheet having perforations 13, such as shown in FIG. 2, is passed through a nickel plating bath and connected therein as the cathode electrode in the electrodeposition process for depositing thereon the desired adhering nickel coating having the desired high porosity. To protect the steel of the support sheet against oxidation, the electrodeposition process may be carried on in such a manner that a long support sheet or wide region thereof is successively passed through a portion of the electrodeposition path between two large surface area nickel anodes for depositing thereon a minute thickness of a solid nickel coating, for instance 1½ to 1 microns thick and thereafter passing it between another set or sets of anodes for passing nickel deposition current with required high cathode current density at the cathode surface of the passing sections of sheet 11 and cause the so further deposited nickel to form a porous adhering ductile nickel coating of 3 to 7 microns thick and even thicker.

FIG. 3 shows, greatly exaggerated, a minute portion of such support sheet 11 having on its opposite extended surfaces and also along its strand edges electrodeposited a porous coating 15 of nickel. As stated before, the innermost stratum of such electrodeposited adhering nickel coating 15 may consist of a solid nickel stratum about ½ to 1 micron thick which suppresses oxidation of the underlying surface of the steel support sheet 11. To the exposed exterior surfaces of the porous nickel coating 15 of the support sheet 11 are joined by sinter bonds the immediately adjacent and contacting carbonyl nickel powder fibers 16 (FIG. 3) of two body layers 18 of similar porous sintered nickel powder particles having substantially high porosity and extending substantially along the entire opposite side surfaces of the nickel plated support sheet 11 and filling all its interstices or perforations 13. FIG. 3 indicates in an approximate general way how two immediately adjacent and contacting carbonyl nickel fiber powder particle layers are adheringly joined by sinter bonds to the opposite major surfaces of the porous nickel coating 15 of support sheet 11, the two dash-double-dot lines 18 indicating the thickness of the sintered porous carbonyl nickel layers adhering by sinter bonds of its innermost nickel fiber 16 to the porous nickel electroplated coating 15 of the support sheet.

FIG. 4 shows in diagrammatic form one system for producing sintered porous battery plates by the process of the invention as described above. A thin great length of reticulated support sheet, such as seen in FIG. 2, is stored in spirally coiled form on a revolvably mounted supply drum 21. The supply drum 21 may be of metal and is shown connected as by contacting member 21–1 to the negative terminal 1(−) of a direct current source of electrodeposition current. The supply drum 21 is also provided with a conventional braking means (not shown) for slightly resisting the withdrawal of the support sheet 11 from its supply drum 21. A conventional nickel plating bath indicated by double-dash-double-dot lines 22 is held in a suitable conventional electrolyte holding vessel indicated by dash line 23 having along its interior surfaces an adhering insulated lining 24 which may consist, for instance, of an adherent layer of polytetrafluroethylene (Teflon) which resists corrosion by the electrolyte.

In the specific system of FIG. 4, a set of laterally spaced guiding rollers 31 and another similar set of laterally spaced guiding rollers 32 are revolvably held in a conventional way for revolving within the electrolyte body 22 of vessel 23 and guiding, if necessary, in conjunction with another similar guiding roller 33 a series of consecutive sheet sections 11–1, 11–2 through the bath 22.

Two anodes 40(+) are held with extended anode surfaces extending along opposite surfaces of the sheet section 11 moving between guide rollers 31, with the two anodes 40(+) being indicated as connected to the positive supply terminal 1(+) of a direct current source which supplies deposition current for depositing on consecutive passing support sheet sections a dense nickel coating about ½ to 1 micron thick.

From the plating bath section between the anodes 40(+) the so initially plated section is drawn over intermediate roller 33 into another section of the plating bath into the position indicated by sheet section 11–2 guided between the two revolvably mounted guide rollers 32. This sheet section 11–2 and the plating bath thereof may be held in a separate plating vessel. This sheet section 11–2 passing through the plating bath 22 between the guide rollers 32 is subjected to nickel plating of its opposite cathode surfaces by two facing opposite electrode anodes 41(+) which are shown connected to the positive terminal 2(+) of a source of deposition current having its negative terminal likewise connected to the negative terminal 1(−) of the source supplying deposition current to the first sheet section 11–1 and which cooperates with positive electrode 1(+). The second source of direct current which supplies deposition current to the two anodes 41(+) is so designed as to deposit nickel on the cathode sheet section 11–2 with a much higher cathode current density than deposited on the first sheet section 11–1 so that the high density current deposited on sheet section 11–2 as a cathode will deposit thereon an adhering nickel layer having high porosity and having the required ductility.

The greater current density with which the additional porous nickel coating is deposited on sheet section 11–2 is such as to cause the additional porous nickel deposit to have a substantial thickness such as 2–4 and up to 6–8 and even 10 microns.

After having deposited thereon the porous nickel coating, the so nickel plated sheet section 11–2 is drawn along loop path 11–3 over revolvable rollers 45, 46, 47 through nickel-powder coating slurry 51 held in a vessel 50. The coating slurry 51 in vessel 50 may consist of water having dispersed therein carbonyl powder particles, the water of the slurry having dissolved therein the appropriate amount of hydrogen generating filler substance, such as urea and, if necessary, additional urea powder dispersed in the slurry 51. The slurry may also contain a minute amount such as up to 3% of a compatible organic adhesive agent which does not interfere with the action of the urea carbonyl content in providing a hydrogen atmosphere along the surfaces of the porous nickel coating and the immediately adjacent contacting carbonyl nickel fibers and between the other nickel powder particles deposited as slurry coatings on the support sheet moving along path 11–3.

The slurry coating deposited along path 11–3 may be very thin and the amount of filler substance contained in the first slurry bath 51 may be low enough to cause the nickel powder content of the coating deposited by bath 51 to be relatively dense and more nearly approach the density of the porous nickel coating than the subsequent second nickel slurry coating deposited thereover. As the slurry coated length support sheet 11 moves along path 11–3 from bath 51 over guide roller 47 it passes through a conventional thickness gauge slit device 48 which assures that the first dense nickel slurry coating deposited on this sheet section is only very thin, for instance, half of and up to the full thickness of the support sheet 11.

As the so deposited thin nickel slurry coating moves with the support sheet 11 from the thickness gauge 48 towards guide roller 47, it is subjected to compression or compacting by two facing revolvably mounted compacting rollers 49 subjected to compression forces indicated by arrows. After the very thin slurry coating of slurry 51 has been compacted on the support sheet 11 by compacting rollers 49, it is drawn along guide paths 11–4, for instance, over another roller 60 held immersed and revolvably mounted within another aqueous slurry 61 analogous to the slurry 51 held in the first slurry vessel. The slurry 61 or vessel contains a larger amount of decomposable filler substance, such as urea so that the second additional slurry coating adherently deposited on the previously deposited very thin slurry coating which, after sintering, shall have the desired higher porosity such as 50–80% and even higher, such as up to 90%. The additional slurry coating deposited on the support sheet section moving along path 11–4 through slurry 61 is thick enough to provide, after sintering on the opposite sides of the support sheet and its perforations, a relatively thick outer porous sintered nickel powder particle layer which together with the support sheet formation has an overall thickness of about .026 inch or in general, between .020 and .030 inch. As the support sheet 11 with the additional second slurry coating deposited thereon is drawn along path 11–4 from the second slurry bath 61, it passes through another thickness gauge slit device 48–1, thereby determining the overall thickness of the porous sintered nickel layers adheringly united by sintering to the moving support sheet 11 passing along path 11–4.

The support sheet 11 with adhering slurry layer holding dispersed the required thickness of nickel powder particles then passes toward location 11–5 through a drying chamber 70 having electrical heating elements 71 for drying off excess water. Thereafter, the support sheet 11 with the dried slurry coating is passed through a conventional sintering furnace 75 having conventional electric heater elements 76 for causing the nickel powder particles of the slurry coating to become sintering to each other by sinter bonds and to cause its innermost carbonyl nickel fiber to be joined by sinter bonds to the porous nickel plating of the support sheet. As the slurry coatings are heated to sintering temperature, the urea and also its organic adhesive content is decomposed, the urea maintaining a hydrogen atmosphere along the porous nickel coating 15 of the support sheet and all the nickel powder particles of the slurry coatings which are united to each other by reliable sinter bonds.

During the sintering operation, the required additional reducing atmosphere is maintained in the ceramic furnace, for instance by supplying it through a pipe 77 with a reducing atmosphere such as an atmosphere of dried cracked ammonia or hydrogen. A sintering treatment in such atmosphere at a temperature of 800–1,000° C. for ten to fifteen minutes is usually sufficient to produce the desired sinter bonds between the nickel powder particles and the electrodeposited porous coating of the support sheet.

Alternatively, the first deposited thin nickel coating of the slurry 51 is subjected to a first such sintering operation in a similar atmosphere at a higher temperature which is still below the melting temperature of nickel for securing a good sinter bond between the innermost layer of the nickel powder particles of slurry 51 with very firm sinter bonds between the porous nickel coating of the support sheet. Thereafter, the second thick slurry stratum of the carbonyl particles 61, as described above, is deposited on the exterior of the so formed high porosity minutely thin nickel powder stratum of support sheet and is subjected to a sintering treatment in a similar sintering furnace 75 under a similar reducing atmosphere.

In the sintering furnace 75, the support sheet is transformed into consecutive sintered-nickel-powder plate sections 10 which are drawn along path 11–5 through a cooling space 77 within a cooling device 78 through which a cooling liquid, such as water is circulated by pipe connections. A protective atmosphere should be maintained in the cooling space as by passing therethrough dry cracked ammonia gas. From the cooling space 77 the finished sintered porous nickel plate length with its support sheet 11 is drawn, for instance, over suitable revolvably mounted pull rollers 81 and auxiliary rollers 82 and spirally wound on revolvably mounted drum 85.

As an alternative, powder metallurgy techniques of the type described in U.S. Patent 2,341,732 of Marvin and in U.S. Patent 2,158,461 of Koehring et al., may be used for producing in accordance with the invention a battery electrode plate consisting of a thin interior rolled metal support sheet having adheringly joined thereto by sinter bonds a minutely thin porous electrodeposited nickel coating to which there is adheringly joined by sinter bonds outer porous sintered carbonyl particle layers similar to those described above in connection with FIG. 4 with the sintered nickel particles also filling wall the interstices or perforations of the support sheet.

FIG. 5 shows an adaptation of such known processes for producing by a process of the invention on a continuous basis a great length of such sintered carbonyl nickel powder battery plate having embedded therein a thin reticulated metal support sheet, for instance, of the shape shown in FIG. 2 having electrodeposited thereon a minutely thin porous electroplated coating of nickel as described above.

A great length of such thin porous nickel electroplated support sheet 5–10 is stored in a spirally coiled form 5–11 on a rotatable mounted supply drum 5–12 which may be subjected to a conventional braking force slightly resisting withdrawal of the support sheet 5–10 therefrom. The electroplated reticulated thin support sheet 5–10 is withdrawn from drum 5–12 in the direction of the arrow 5–13 so as to pass between facing portions of two carbonyl-powder feeding endless belts 5–20. Each belt 5–20 may consist of a stainless steel sheet and is guided in a continuous motion indicated by arrows 5–21 on support rollers 5–22, 5–23 so that the two facing belt portions held by the two adjacent opposite belt pulling and compacting rollers 5–22 are spaced from the length of the support sheet 5–10 passing between them by a very small thickness, such as .003 to .006 inch.

Each belt 5–20 is supported on its upper side by the flat surface of a supporting plate 5–25. Along the upper side of each belt 5–20 is held a hopper 5–27 holding therein a powder mixture 5–28 consisting of carbonyl nickel powder particles having admixed thereto in proper proportion of hydrogen supplying filler substance, such as fine urea powder, with or without a minute powder ingredient which increases the adherence of the powder mixture particles when they are compacted or compressed under pressure against the support sheet 5–10.

A smoothing and gauge device 5–29 is adjustable for determining the thickness of the powder layer 5–30 fed from the hopper 5–28 on to the upper side of each moving belt 5–20. The two thin powder layers 5–20 are carried by the two moving belts 5–20 in opposite direction toward the opposite faces of the downwardly moving support sheet 5–10 between the two adjacently positioned belt driving and powder compacting rollers 5–22. The two adjacent compacting belt rollers 5–22 are adjustably mounted (in a conventional way) to provide the desired thickness of the powder layer compacted from opposite sides onto the support sheet 5–10 passing between them.

In passing between the opposite compacting rollers 5–22 carried by the two belts 5–20 the powder mixture layers 5-30 are compressed and compacted into a self-adhering and sustaining composite sheet formation 5-31 which emerges from the lower side between the two compacting rollers 5-22 and their belts.

This so emerging self-sustaining composite sheet formation 5-31 consists of a central nickel plated reticulated ductile metal support sheet with two layers of the powder mixture adhering to its opposite surfaces and also being compacted into all its perforations. Conventional scrapers 5-32 bear against a portion of the two feed belts 5-20 emerging downwardly from between the compacting rollers 5-22 for removing any compacted powder material that might remain on the surface of the so emerging belts. A revolving brush 5-35 engages each feed belt 5-20 as it passes over its guide roller 5-23 for applying thereto a smoothing medium, such as urea powder or an aqueous solution of urea from an adjacent container to suppress adherence of the deposited powder layers 5-30 to the belts.

The composite sheet formation 5-31 emerging between the set of two feed belts 5-20 is fed in a similar manner to a similar other set of two belts 6-20 carried and driven by two sets of rollers 6-22 and 6-23 for feeding two powder mixture layers 6-30 from hoppers 6-27 past the thickness gauges 6-29 for similarly compacting the additional powder layers 6-30 against the composite sheet formation 5-31. Thus, the set of lower belts 6-20 feed two additional powder mixture layers 6-30 against the opposite surfaces of the sheet formation 5-31, which two powder mixture layers 6-30 are compacted by rollers 6-22 rotating in the direction of their arrows against the surfaces of the sheet formation 5-31 as it emerges downwardly between the two feed belts 6-20. The space between the feed belt portions 6-20 which face each other with the compacting rollers 6-22 across the moving sheet formation 5-31 is large enough for compacting against the sheet formation 5-31 two additional exterior powder layers of the desired greater thickness so that the total thickness of the sheet formation 6-31 which emerges downwardly from between the two belts 6-22 is of a thickness about .026 inch or in general, between .020 and .030 inch.

The composite thicker sheet formation 6-31 emerging from between the two lower feed belts 6-20 constitutes a self-sustaining or supporting composite structure and is guided over suitably supported guide rollers 6-41. An additional compression step may be applied to the so guided thicker composite set formation 31 by means of two resiliently mounted compacting rollers 6-42 rotating in the direction of the applied arrows in engagement with the opposite surfaces of the thereby compacted sheet formation 6-31.

The final sheet formation 6-40 emerging to the left of the compression rollers 6-42 consists of a thin central reticulated strong metallic support sheet 5-10 having an adhering porous nickel coating against which are compacted two adjacent opposite thin compacted inner powder layers 6-33 of about the same thickness as the thin sheet formation 5-10 and two opposite outer compacted powder layers 6-33 formed of the powder mixtures 6-28 from the two lower powder supply hoppers 6-28. The powder mixtures 5-28 from the two upper powder supply hoppers contains a smaller proportion, for instance only ½ to ⅔, of the proportion of urea contained in the powder mixture 6-28 of the lower hoppers. Because of this lower proportion of the urea content in the inner compacted powder layers 6-32, it will after sintering yield a thin adhering sintered nickel layer of less porosity and greater density than the outer sintered nickel powder layer. After sintering, the inner powder layer 6-33 will yield a higher density sintered nickel powder layer than the high porosity outer sintered nickel powder layers 6-32.

As stated above, the composite compacted self-sustaining sheet formation emerging to the left from between the two compacting rollers 6-42 is thereafter subjected to sintering treatment such as described above in connection with FIGURE 4. It should be noted that the two belt feeder rollers 5-22 are driven in opposite direction at a similar speed and uniformly compress the powder mixtures against the support sheet 5-10 into a self-sustaining sheet formation 5-31 wherein the compacted powder layer has substantially uniform densities throughout. The same is true with respect to the two driven belt rollers 6-22 and the additional outer compacted powder layers 6-33 of the sheet formation 6-31 which likewise constitutes a self-sustaining composite structure.

Suitable conventional means (not shown) are provided for synchronizing the rotation of the respective pairs of rollers 5-22, 6-22 and 6-42 so as to not subject the continuously moving sheet formations 5-10, 5-31 and 6-31 to any disturbing strains as they are subjected to the successive treatments described above.

It is of advantage to first deposit on the above described porous-nickel coated support sheet 5-10 a very thin carbonyl nickel urea powder layer which is only .005 inch thick and containing less urea powder admixed thereto so as to first form a composite sheet formation 5-31 having two adherent compacted powder mixture layers with an overall thickness only about .010 inch thick. The urea content of this compacted inner powder layer body 6-32 is smaller than required in the subsequently formed outer compacted powder layer bodies 6-33. Upon sintering, this inner sintered nickel powder layer body 6-32 will have a density greater than the density of the more porous outer sintered nickel layers 6-33 of the sintered finished composite sheet formation 6-31 having the desired thickness, such as .026 inch and the required high porosity, such as 65 to 85% in the outer strata of the composite sintered nickel powder layers. In the just described process, after first compacting the less urea powder containing nickel powder layer body 6-31 to the porous-nickel plated support sheet 5-10, the resulting composite sheet formation 5-31 is passed between two outer similar belts 6-20 and their similar compacting rollers 6-22 which is compacted over the inward powder layer body 6-32 and an outer powder layer body 6-33 containing the required greater proportion of urea powder to yield a final composite rolled sheet-reinforced sintered battery plate structure of the required porosity.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A process for the production of a sintered porous electrode plate for rechargeable battery cells, such as a nickel-cadmium cell, comprising the steps of:

electroplating a thin, strong metallic support sheet .003 to .005 inch thick with a thin, porous electroplated nickel coating, thereafter depositing on said electroplated nickel coating a layer of nickel powder particles containing distributed therein a hydrogen evolving filler substance, forcing at least the inner particle stratum of said nickel particle layer into the adjacent surface of said electroplated nickel coating to increase surface contact between the nickel particle layer and the porous nickel coating of said support sheet, thereafter subjecting the so formed composite structure to a sintering treatment in the presence of an atmosphere which reduces nickel oxide and causes said distributed filler substance to evolve hydrogen along said contacting surfaces between said electroplated coating, said inner nickel particle stratum, and between the nickel particles of said layer to yield a sheet reinforced sintered nickel particle layer exhibiting high porosity in the layer strata beyond said inner nickel particle stratum.

2. The process of claim 1 wherein said support sheet is formed so that its entire main surface has thin wire-like strands which define between them perforations extending over 30% to 80% of its surface.

3. The process of claim 1 further comprising the steps of:

holding said nickel powder and said filler compound dispersed and distributed in an aqueous slurry, first applying a minute first coating stratum of said slurry to said sheet having a thickness of the order of one-half to one times the thickness of said support sheet and compressing said minute slurry coating stratum against the underlying electroplated nickel coating, thereafter depositing on said first slurry coating a further slurry coating to increase the overall thickness of the deposited slurry coatings and the support sheet in the range between .020 and .030 inch, and thereafter subjecting said support sheet with said deposited slurry coatings to said sintering treatment causing the nickel particles of said first coating stratum to adhere by sinter bonds to the porous nickel coating of the support sheet and causing all nickel particles of said slurry coatings to adhere by sinter bonds to one another.

4. The process of claim 1 further comprising the steps of:

holding said nickel powder and said filler compound dispersed and distributed in an aqueous slurry, first applying a minute first coating stratum of said slurry to said sheet having a thickness of the order of said support sheet and compressing said minute slurry coating stratum against the underlying electroplated nickel coating, thereafter depositing on said first minute slurry coating stratum a further slurry coating to increase the overall thickness of the deposited slurry coatings including the support sheet to a range between .020 and .030 inch.

and thereafter subjecting said support sheet with said deposited slurry coatings to said sintering treatment causing the nickel particles of said first coating stratum to adhere by sinter bonds to the porous nickel coating of the support sheet and causing all nickel particles of said slurry coatings to adhere by sinter bonds to each other, said support sheet being formed throughout its main surface of thin, wire-like strands which define between them perforations extending over 30% to 80% of its surface.

5. The process of claim 1 further comprising the steps of:

compacting on to said support sheet a first powder mixture layer of said nickel particles and said filler substance to the support sheet as an adhering first powder coating stratum which has a thickness in the range from one-half to one times as thick as the support sheet, thereafter compacting on to said first powder layer a similar thicker powder mixture layer containing a materially greater proportion of said filler substance, over said first powder mixture stratum to form an overall thickness with said support sheet and said compacted powder mixtures which lies between .020 and .030 inch.

and thereafter subjecting said composite sheet structure to said sintering treatment.

6. The process of claim 1 further comprising the steps of:

compacting on to said support sheet a first powder mixture stratum of said nickel particles and said filler substance having a thickness of the order of one-half to one times the full thickness of said support sheet which forms an adhering first powder coating stratum, thereafter compacting over said powder mixture stratum a similar powder mixture layer containing a materially greater proportion of said filler substance than said first powder mixture stratum to increase the overall thickness of said support sheet and said powder layers in the range from .020 inch.

said support sheet being formed of thin, wire-like strands over its main surface which define between the perforations extending over 30% to 80% of its surface.

References Cited

UNITED STATES PATENTS 3,186,871  6/1965  Donohue _____ 136—120 X

ALLEN B. CURTIS, *Primary Examiner.*

WINSTON A. DOUGLAS, *Examiner.*

N. P. BULLOCH, O. F. CRUTCHFIELD,
*Assistant Examiners.*